United States Patent
Kothari et al.

(10) Patent No.: US 9,565,676 B1
(45) Date of Patent: Feb. 7, 2017

(54) METHODS AND SYSTEMS FOR SERVING A MOBILITY-LIMITED USER EQUIPMENT DEVICE USING CARRIER AGGREGATION

(71) Applicant: Sprint Spectrum L.P., Overland Park, KS (US)

(72) Inventors: Pratik Kothari, Sterling, VA (US); Parashar Thanki, Herndon, VA (US); Hemanth B. Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 82 days.

(21) Appl. No.: 14/577,465

(22) Filed: Dec. 19, 2014

(51) Int. Cl.
*H04W 72/00* (2009.01)
*H04W 72/04* (2009.01)
*H04W 64/00* (2009.01)

(52) U.S. Cl.
CPC ......... *H04W 72/0453* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2014/0092736 A1* | 4/2014 | Baillargeon | H04W 72/1226 370/230 |
| 2015/0085792 A1* | 3/2015 | Reddy | H04W 16/14 370/329 |
| 2015/0172032 A1* | 6/2015 | Khay-Ibbat | H04L 5/0057 370/329 |
| 2015/0245250 A1* | 8/2015 | Bhattacharjee | H04L 5/001 370/236 |

FOREIGN PATENT DOCUMENTS

| | | | | |
|---|---|---|---|---|
| FI | WO 2014161576 A1 * | 10/2014 | | H04W 36/0083 |
| SE | WO 2015176996 A1 * | 11/2015 | | H04W 36/0088 |

* cited by examiner

*Primary Examiner* — German J Viana di Prisco

(57) ABSTRACT

Methods and systems for providing a mobility-limited user equipment device (UE) are disclosed. While a first base station serves a UE in a first coverage area on a first carrier, either the first base station or the UE makes a first determination that the UE is substantially stationary. Responsive to at least making the first determination, the first base station causes the UE to receive service on a second carrier concurrently with the first base station continuing to serve the UE in the first coverage area on the first carrier. By way of example, the first base station may provide the second carrier in the first coverage area, or a second base station may provide the second carrier in a second coverage area.

9 Claims, 6 Drawing Sheets

METHODS AND SYSTEMS FOR SERVING A MOBILITY-LIMITED USER EQUIPMENT DEVICE USING CARRIER AGGREGATION

BACKGROUND

Unless otherwise indicated herein, the description in this section is not itself prior art to the claims and is not admitted to be prior art by inclusion in this section.

A typical cellular wireless network includes a number of base stations that radiate to define wireless coverage areas, such as sectors, in which user equipment devices (UEs), such as cellular phones, smartphones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover between coverage areas, and functions related to air interface communication.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, a base station and a served UE may transmit symbols to each other in these resource elements, particularly on subcarriers that are spaced apart from each other by 15 kHz and in time segments spanning 67 μs each.

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the base station can allocate on an as-needed basis to carry transmissions to particular UEs, with still other resource elements being reserved to define a downlink reference signal. Likewise, on the uplink, certain resource elements across the bandwidth may be reserved to define a physical uplink control channel (PUCCH), and other resource elements may be reserved to define a physical uplink shared channel (PUSCH) that the base station can allocate on an as-needed basis to carry transmissions from particular UEs.

During a communication session, a UE may engage in communication of bearer data (e.g., application layer communications, such as session initiation protocol (SIP) signaling, voice communication, video communication, file transfer, gaming communication, or the like), transmitting to the base station bearer data on uplink traffic channel resources (e.g., portions of a resource block of a PUSCH channel during a scheduled TTI) and receiving from the base station bearer data on downlink traffic channel resources (e.g., portions of a resource block of a PUSCH channel during a scheduled TTI). Typically, the UE and the base station transmit such bearer data in the form of data packets.

An effective data rate for bearer data sent between the network entity and the UE (e.g., the rate at which the UE and the network entity exchange data packets) depends at least in part on a wireless data rate for communications between the base station and the UE (e.g., the rate at which the UE and the base station wirelessly exchange data packets with each other). Generally speaking, the effective data rate varies with the wireless data rate; as the wireless data rate decreases, the effective data rate decreases. The wireless data rate in turn depends at least in part on several factors.

One such factor is air interface quality between the base station and the UE in the serving coverage area. On a given carrier, the wireless data rate may vary directly with air interface quality. By way of example, good downlink air interface quality between the base station and the UE in the serving coverage area (e.g., when the UE receives strong downlink channel signals) usually allows for a higher wireless data rate than poor downlink air interface quality (e.g., when the UE receives weak downlink channel signals). Further, when air interface quality between the base station and the UE in the serving coverage area is poor, the UE and/or the base station may receive incomplete data packets. This may require the UE or the base station to retransmit such data packets, thereby further reducing the effective data rate.

A second factor is the bandwidth of the carrier on which the UE receives service in the serving coverage area. Typically, a wider carrier bandwidth may support a higher wireless data rate. A 20 MHz carrier will usually allow for a higher data rate than a 5 MHz carrier for instance.

While the maximum bandwidth for a data transaction between a base station and a UE using a single carrier is 20 MHz (in an LTE system), it may be possible to increase the bandwidth for wireless communications with a UE beyond 20 MHz. A revision of LTE known as LTE-Advanced now permits a base station to serve a UE with "carrier aggregation," by which a base station schedules bearer communication with the UE on multiple carriers at a time. With carrier aggregation, multiple carriers from either contiguous frequency bands or non-contiguous frequency bands can be aggregated to increase the bandwidth available to the UE. Using carrier aggregation, a base station may increase the maximum bandwidth to up to 100 MHz by aggregating up to five carriers. Each aggregated carrier is referred to as a "component carrier." Further, when multiple carriers are aggregated, one of the component carriers may be defined as a primary cell ("PCell") and the remaining component carriers may be defined as secondary cells ("SCells"). Further, a UE served with carrier aggregation may send and receive control signals and bearer data in the PCell and the SCells.

OVERVIEW

As noted above, a UE may engage in air interface communications with a base station to communicate via the base station with a network entity, such as a server or another UE. To maintain continuity of the communication session, a UE will typically request a handover from a serving coverage area to a neighbor coverage area prior to the UE leaving the serving coverage area. This helps to ensure that the neighbor station begins serving the UE in the neighbor coverage area before air interface quality between the UE and the initial serving base station deteriorates to the point where the communication session is interrupted.

In addition to ensuring that a handover occurs before a UE leaves a serving coverage area, a base station may set the handover thresholds such that the effective data rate for a communication session between a UE and a network entity remains relatively high. A low effective data rate is undesirable for several reasons. First, if the UE is user-operated, a low effective data rate may reduce the quality of a UE user's experience during a communication session. For example, if the UE is streaming a video during the communication session, a low effective data rate could cause choppy video, buffering delays, low-resolution video, or pixilation for instance. And if the effective data rate is too low, the UE may not be able to complete the communication session. Further, a low effective data rate may prolong the communication session, thereby consuming wireless resources that a serving base station could otherwise reallocate to serve other UEs in the serving coverage area.

To this end, a UE may regularly monitor reference signals in the serving coverage area and one or more neighbor coverage areas to determine when to request a handover. By way of example, a base station may transmit to its served UEs a list of handover thresholds that the UEs should use as a basis for determining when to provide measurement reports or to initiate a handover. Example handover thresholds may include various signal strength thresholds defining particular handover-related events, such as:

"S-measure": Serving coverage area signal strength threshold below which the UE begins evaluating other handover thresholds A2 event: Serving coverage area signal strength becomes worse than a threshold, to trigger handover A3 event: Neighbor cell signal strength becomes more than a threshold delta higher than serving cell signal strength, to trigger handover A4 event: Neighbor cell signal strength becomes more than a threshold delta higher than a threshold, to trigger handover A5 event: Serving coverage area signal strength becomes lower than one threshold, and neighbor coverage area signal strength becomes higher than another threshold, to trigger handover Other handover thresholds may be specified as well. When a UE determines that a handover-related event has occurred, the UE may send to the serving base station signal strength measurements for received downlink reference signals, or the UE may signal the serving base station to initiate a handover to a neighbor coverage area.

A handover may not always be necessary to maintain continuity of the communication session. For example, consider a mobility-limited UE located in an area where coverage areas overlap. A UE is "mobility-limited" when, during a communication session, the movement of the UE is constrained to a relatively small area (e.g., a house or an apartment building). When a UE is mobility-limited, air interface quality between the UE and the base stations providing the overlapping coverage areas may remain relatively constant during a communication session. Since a mobility-limited UE is unlikely to leave a serving coverage area during a communication session, the serving base station could continue serving the UE, although the UE might experience a higher wireless data rate in a neighbor coverage area.

Further, handing over a mobility-limited UE to a neighbor coverage area may not improve the UE's wireless data rate. By way of example, a mobility-limited UE could experience (or could continue to experience) low wireless data rates after a handover because either (1) the air interface quality between the mobility-limited UE and the new serving base station is poor (e.g., when the UE is far away from the new serving base station) or (2) the bandwidth of the carrier in the new serving coverage area is narrower than the bandwidth of the carrier in the previous serving coverage area. And a mobility-limited UE may unnecessarily expend battery power (i.e., the amount of charge remaining in the UE's battery) when monitoring for handover-related events, as receiving and measuring downlink reference signals and transmitting measurement reports or handover requests requires, at a minimum, powering the UE's transceiver.

The present disclosure provides an alternative to handing over a mobility-limited UE when the UE is located in an area where two coverage areas overlap. Rather than conducting a handover, the methods and systems disclosed herein involve using carrier aggregation to serve a mobility-limited UE. Per the disclosure, when a UE is located in (a) a coverage area in which the serving base station provides multiple carriers or (b) an area in which multiple coverage areas overlap one another, the UE or a serving base station may make a determination that the UE is substantially stationary (i.e., mobility-limited). A UE is "substantially stationary" when, during at least a portion of a communication session, the UE is stationary (i.e., does not move from a fixed position) or move less than a threshold extent during a at least a portion of the communication session, such as when the UE is constrained to a particular structure or relatively small geographical area (e.g., a neighborhood park) for instance. A UE would thus be substantially stationary when the UE remains inside a house, an apartment building, or an office building during at least a portion of a communication session.

By way of example, making the determination that the UE is substantially stationary may include determining that, during a predefined non-zero threshold time period, the UE moves less than a threshold extent. The threshold extent could be a predefined distance from a location of the UE when the predefined non-zero threshold time begins. Alternatively, the threshold extent could be a distance traveled by the UE during the non-zero threshold time period, or the threshold extent could be proportional to the size of the area of overlap (e.g., the threshold extent may increase as the size of the area of overlap increases). The threshold extent may thus be a distance of several meters or even several hundred meters for instance.

The predefined non-zero threshold time period in turn could vary from coverage area to coverage area based on expected network loading conditions. By way of example, the threshold time period could be several minutes or dozens of minutes. Further, the threshold time period may not be limited to the time period during which the serving base station serves the UE in the first coverage area. The non-zero threshold time period could thus extend from a time prior to the serving base station beginning to serve the UE in the first coverage area to a time after the serving base station began serving the UE in the first coverage area.

Either the serving base station or the UE could make the determination that UE is substantially stationary based on determined positions of the UE during a portion of the communication session. Responsive to at least making such a determination, the serving base station may aggregate two or more carriers to serve a UE. The aggregated carriers could include two or more carriers provided by the serving base station in the serving coverage area (and perhaps in an overlapping coverage area) and/or one or more carriers provided by a neighbor base station in a neighbor coverage area.

Accordingly, the disclosure provides a first method operable in a wireless communication system. The wireless communication system comprises a base station that radiates to define a coverage area. The first method comprises the base station serving the UE in the coverage area on a first carrier, and while the base station serves the UE in the coverage area on the first carrier, making a first determination that the UE is substantially stationary. Responsive to at least making the first determination, the first method then includes serving the UE on a second carrier concurrently with the base station continuing to serve the UE in the coverage area on the first carrier.

In another aspect, the disclosure provides a second method operable in a wireless communication system. Here, the wireless communication system includes (i) a first base station that radiates to define a first coverage area, (ii) a second base station that radiates to define a second coverage area, with the first coverage area and the second coverage area overlapping each other to define an area of overlap. While a UE is located in the area of overlap, the second method includes the first base station serving the UE in the first coverage area on a first carrier concurrently with the second base station serving the UE in the second coverage area on a second carrier. And while the first base station serves the UE in the first coverage area on the first carrier concurrently with the second base station serving the UE in the second coverage area on the second carrier, the second method includes making a first determination that the UE is substantially stationary. Responsive to at least making the first determination, the second method includes serving the UE on a third carrier concurrently with (a) the first base station continuing to serve the UE in the first coverage area on the first carrier and (b) the second base station continuing to serve the UE in the second coverage area on the second carrier.

In yet another aspect, the disclosure provides a base station. The first base station comprises an antenna structure configured to radiate to define a first coverage area, a network communication interface for communicating with the second base station, and a controller. Here, the controller is configured to (i) cause the base station to serve a UE in the first coverage area on a first carrier, (ii) while the base station serves the UE in the first coverage area on the first carrier, make a first determination that the UE is substantially stationary, and (iii) responsive to at least the first determination, cause the UE to receive service on a second carrier concurrently with the base station continuing to serve the UE in the first coverage area on the first carrier.

Serving the UE with carrier aggregation instead of handing the UE over to a neighbor coverage area may provide a number of benefits. As described above, serving a UE with carrier aggregation may increase the bandwidth for wireless communications with that UE, thereby increasing the UE's wireless data rate and, by extension, the effective data rate for communications between the UE and a network entity. As a result, the quality of data exchanged during the communication session may be better (e.g., streaming higher-quality video) than on a single carrier, even if air interface quality between the UE and each serving base station is threshold poor. Further, the serving base station may signal the UE to suspend monitoring for handover-related events while the UE receives carrier-aggregation service, thereby conserving the UE's battery power. Additionally, serving the UE with carrier aggregation may also allow the UE to complete a given communication session sooner than the UE would on a single carrier, thereby freeing up resources in the primary coverage area (i.e., the PCell) for allocation to other served UEs in that coverage area.

In some implementations, the serving base station or the UE may also determine that air interface quality between the UE and the serving base station is threshold poor before the UE receives carrier-aggregated service. In this manner, the serving base station may reserve carrier-aggregated service for UE's with low wireless data rates, which are more likely to either consume more wireless resources in the serving coverage area or consume wireless resources for a longer period of time.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
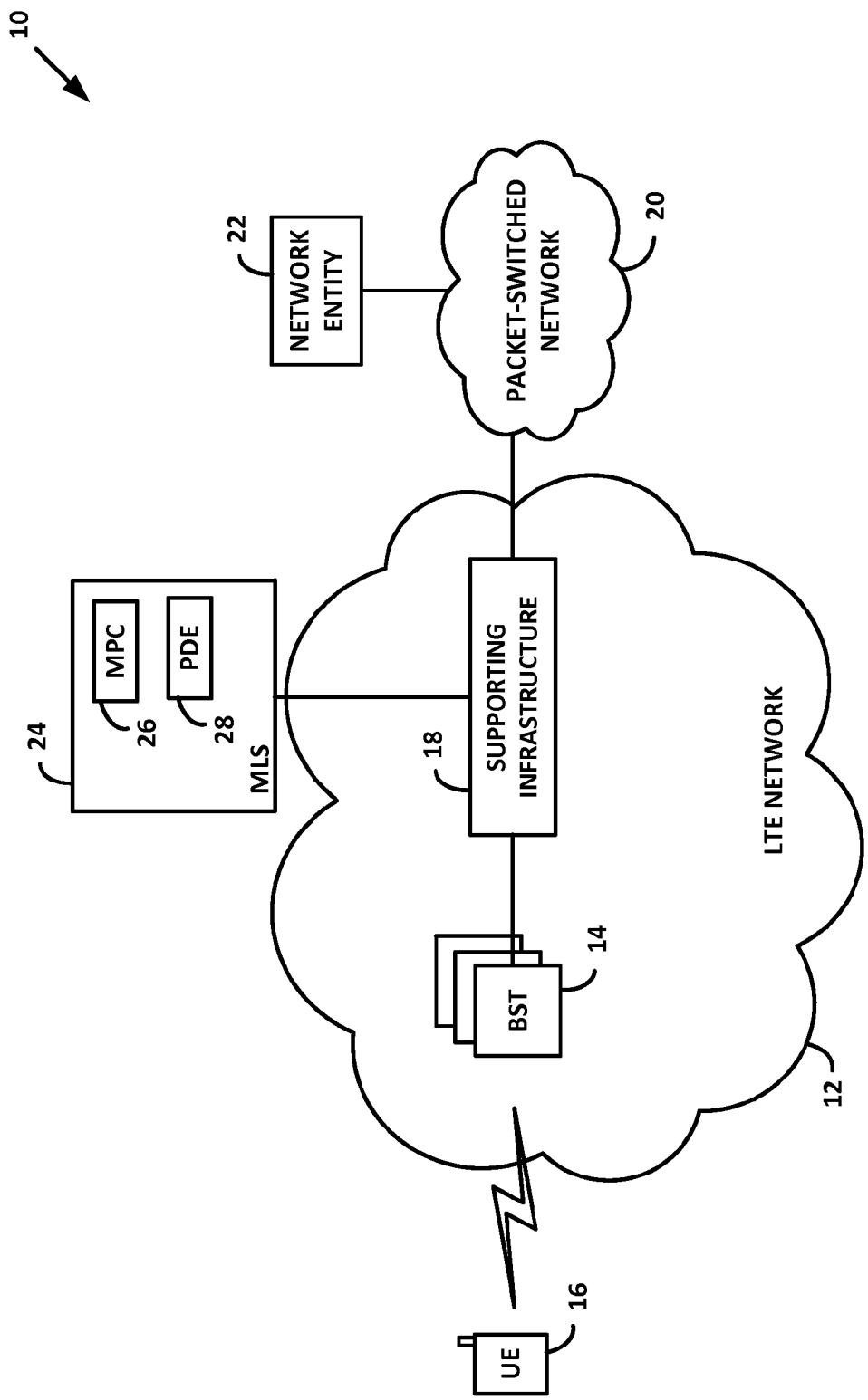
FIG. 1 is a simplified block diagram of a wireless communication system in which aspects of the present method can be implemented.

FIG. 1 is a simplified block diagram of a wireless communication system 10 in which the aspects of the present disclosure can be implemented. In particular, FIG. 1 depicts a representative LTE network 12, which functions primarily to serve UEs with wireless packet data communication service but may also provide other functions. As shown, the LTE network 12 includes base stations 14 (e.g., eNodeBs), each of which has an antenna structure and associated equipment for providing wireless service in one or more coverage areas in which to serve UEs, such as a UE 16 as shown. Each base station 14 may be a macro cell base station (e.g., a tower) that provides wireless service in one or more sectors covering a wide area, or may alternatively be a small cell base station (e.g., a femtocell, a picocell, etc.) that radiates to provide wireless coverage in a smaller area than a macro cell base station.

The LTE network 12 also includes supporting infrastructure 18, such as a base station controller, a radio network controller, a mobility management entity, a mobile switching center, and/or a gateway, which may function to control aspects of base station operation and/or to provide connectivity with a packet-switched network 20, thereby allowing the UE 16 to engage in a communication session with a network entity 22 (e.g., a server). Supporting infrastructure 18 may also function to provide connectivity to a mobile location service (MLS) 24, which may function to determine and report to requesting entities locations of UEs served by the LTE network 12. The MLS 24 may include a mobile positioning center (MPC) 26 and a position-determination entity (PDE) 28, which may be integrated together and may apply a location-determination process so as to determine the location of a plurality of UEs to be reported to requesting entities.

Figure 2:
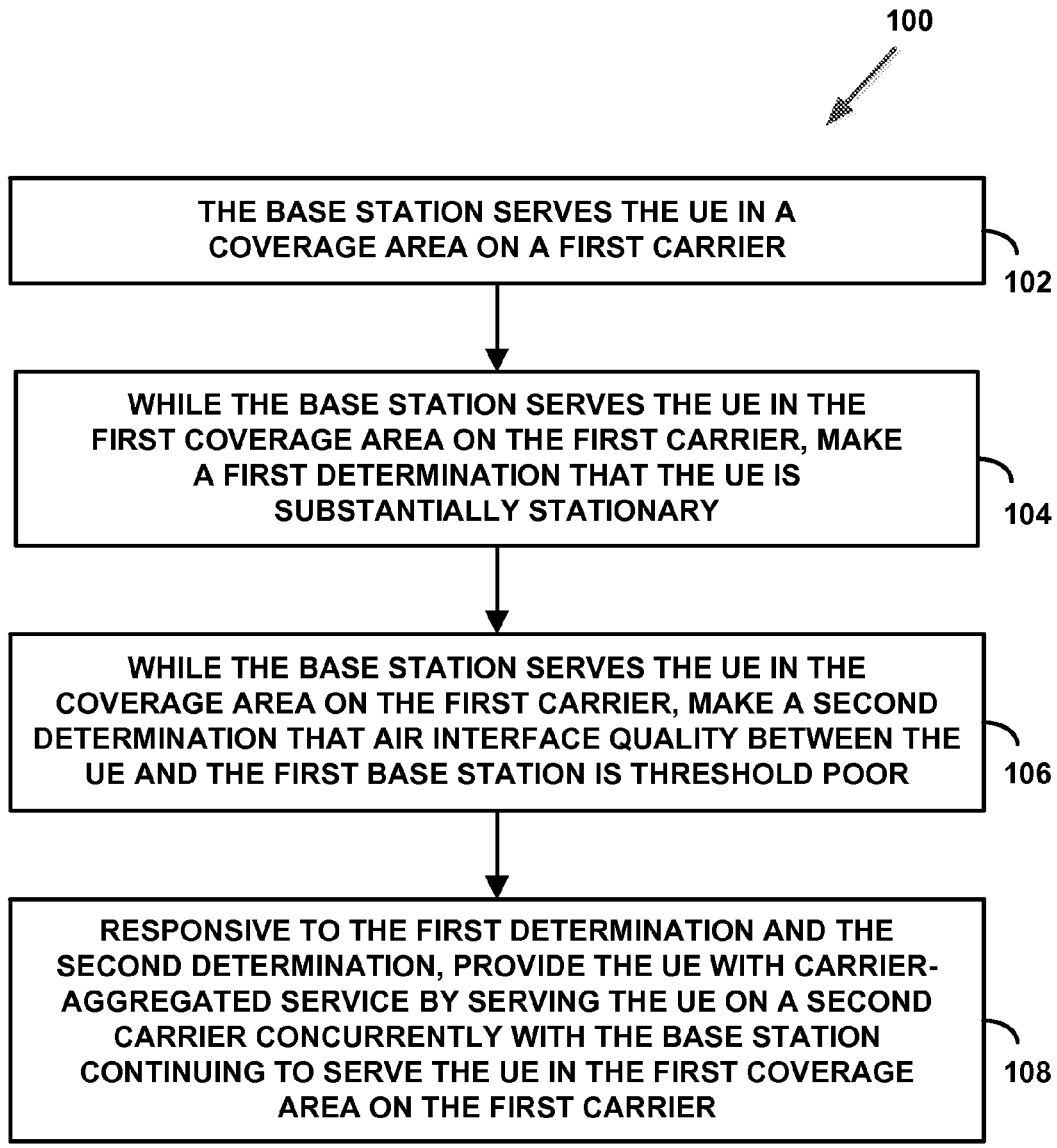
FIG. 2 is a flow chart depicting example base station operations in accordance with the disclosure.

In accordance with the discussion above, a serving base station may aggregate one or more carriers for serving a mobility-limited UE. FIG. 2 shows a first example method 100 that is operable in a wireless communication system to achieve this end, with such a wireless communication system comprising a base station that radiates to define a first coverage area and provides service in the first coverage area on multiple carriers.

Beginning at block 102, the method 100 includes the base station serving a UE in the first coverage area on a first carrier. The UE may being a communication session by communicating with the base station in a particular TTI (e.g., per scheduling by the base station) to send bearer data to or to receive bearer data from a network entity. To this end, the base station may assign to the UE, in a particular TTI, one or more resource blocks on either the PDSCH or the PUSCH for the first carrier in the first coverage area.

While the base station serves the UE in the first coverage area on the first carrier, the method 100 next includes making a first determination that the UE is substantially stationary, at block 104. By way of example, making the first determination may include determining that, for a predefined non-zero threshold time period, the UE has not moved more than a threshold extent. In line with the discussion above, the threshold extent may be set such that the UE is determined to be substantially stationary when the UE is located in a particular structure (e.g., home or building) or a relatively small area (e.g., a neighborhood park).

In practice, either the UE or the base station could make the first determination. As one example, the UE could triangulate its location (e.g., geographic coordinates) based on three or more base station delay measurements, each of which is indicative of the time taken for the UE to receive a downlink reference signal in a particular coverage area. Or if the UE includes a Global Positioning System (GPS) receiver, then the UE could determine its location based on the time taken for the UE to receive each of a plurality of GPS satellite signals. Alternatively (and perhaps more likely), the UE could periodically send to an MLS (e.g., the MLS 24) data indicative of base station delay measurements or GPS signal measurements. Responsive to receiving such data, the MLS may then determine a location of the UE and send a determined location to the UE. In either event, the UE may determine it is substantially stationary based on a plurality of determined locations, with each location correlating to a particular time.

In an example where the base station makes the first determination, the base station may receive a plurality of location reports from either the UE or the MLS. Here, each location report may correlate data indicative of a location of the UE to a particular time. While a location report received from the MLS may include data indicative of a determined location of the UE at a particular time, a location report received from the UE may include either the determined location of the UE or delay measurements made by the UE. If the location reports received from the UE include delay measurements, then the base station may send the delay measurements to the MLS, and the MLS may determine the location of the UE and send the determined location to the base station. Or the base station could determine the location of the UE based on the received delay measurements if the base station is configured to make such determinations. Regardless, the base station may make the first determination by determining that, based on the data included in the plurality of location reports (and thus the determined location of the UE at a plurality of times), the UE is substantially stationary.

Continuing at block 106, the method 100 includes making a second determination that air interface quality between the UE and the base station is threshold poor. As with the first determination, either the UE or the base station could make the second determination. As one example, the UE could make the second determination by at least determining that downlink air interface quality (e.g., the strength of downlink reference signals or received bearer data transmissions) between the UE and the base station is threshold poor. As another example, the base station could receive an uplink reference signal from the UE and, based on at least the uplink reference signal, make the second determination by determining that the UE's uplink air interface quality between the UE and the base station is threshold poor.

As yet another example, the UE could determine and send to the base station a channel quality indicator (CQI), with the CQI being based on at least downlink air interface quality between the base station and the UE in the first coverage area. In practice, a base station may use a CQI to determine the wireless data rate for communications with a served UE in a serving coverage area. Generally speaking, the lower the CQI, the poorer the downlink air interface quality between a base station and a served UE in the serving coverage area. Here, the base station may receive the CQI from the UE and may make the second determination by determining that the received CQI is threshold low.

Finally at block 108, the method 100 includes, responsive to making the first determination and the second determination, serving the UE on a second carrier concurrently with the base station continuing to serve the UE in the first coverage area on the first carrier. By way of example, the base station provides the second carrier in the first coverage area. After performing the functions of block 108, the base station may serve the mobility-limited UE in the first coverage area on both the first and second carriers, thereby providing the mobility-limited UE with carrier-aggregated service.

In one example, performing the functions of block 108 may first include identifying the second carrier as one of one or more component carriers for carrier aggregation. Again, either the base station or the UE may identify the second carrier as one of one or more component carriers. For instance, the UE may identify the second carrier as a component carrier in response to receiving a downlink reference signal from the base station in the first coverage area on the second carrier. Or the base station may identify the second carrier as a component carrier by virtue of serving the UE in the first coverage area.

In an example where UE performed the functions of blocks 104 and 106, performing the functions of block 108 may further include the UE, responsive to making the first determination and the second determination, sending to the base station a request for carrier aggregation, with the request identifying the second carrier as one of one or more component carriers. In response to receiving such a request, or in response to making the first determination and the second determination itself, the base station may assign to the UE, for a scheduled TTI, one or more resource blocks on the PUSCH or the PDSCH of the second carrier in the first coverage area.

In an example where UE performed the functions of blocks 104 and 106, performing the functions of block 108 may further include the UE, responsive to making the first determination and the second determination, sending to the base station a request for carrier aggregation, with the request identifying the second carrier as one of one or more component carriers. In response to receiving such a request, or in response to making the first determination and the second determination itself, the base station may assign to the UE, for a scheduled TTI, one or more resource blocks on the PUSCH or the PDSCH of the second carrier. The base station may then send to the UE information indicative of the assigned resources on the second carrier.

After performing the functions of block 108, the UE may exchange bearer data with the serving base station (and perhaps a neighbor base station) on multiple carriers. As a result, the UE's bandwidth for wireless communications may increase to as much as the sum of the bandwidths of the first and second carriers. For example, if the bandwidths of the first carrier and second carrier are the same, the bandwidth for wirelessly transmitting data to or from the UE may double. The effective data rate for communications between the UE and the network entity may similarly increase.

The serving base station may continue serving the UE using carrier aggregation until the UE completes the communication session. Alternatively, the serving base station may continue serving the UE using carrier aggregation while the UE remains substantially stationary during the communication session. To this end, the serving base station or the UE may periodically perform functions similar to those described with respect to block 104 to determine if the UE is substantially stationary. Upon determining that the UE is not substantially stationary, the serving base station may signal the UE to end the carrier-aggregated service.

In an additional example, in response to providing the UE with carrier-aggregated service, the serving base station may signal the UE to temporarily stop monitoring for handover-related events. In line with the above discussion, causing the UE to temporarily stop monitoring for handover-related events may conserve the UE's battery power. The time period during which the UE does not monitor for handover-related events could vary depending on the situation. As one example, receiving the signal could cause the UE to suspend monitoring while the UE receives carrier-aggregated service. The UE may thus resume monitoring for handover-related events after completing the communication session. Alternatively, the UE may suspend monitoring for handover-related events for a predefined time period, such as several minutes or longer.

Figure 3:
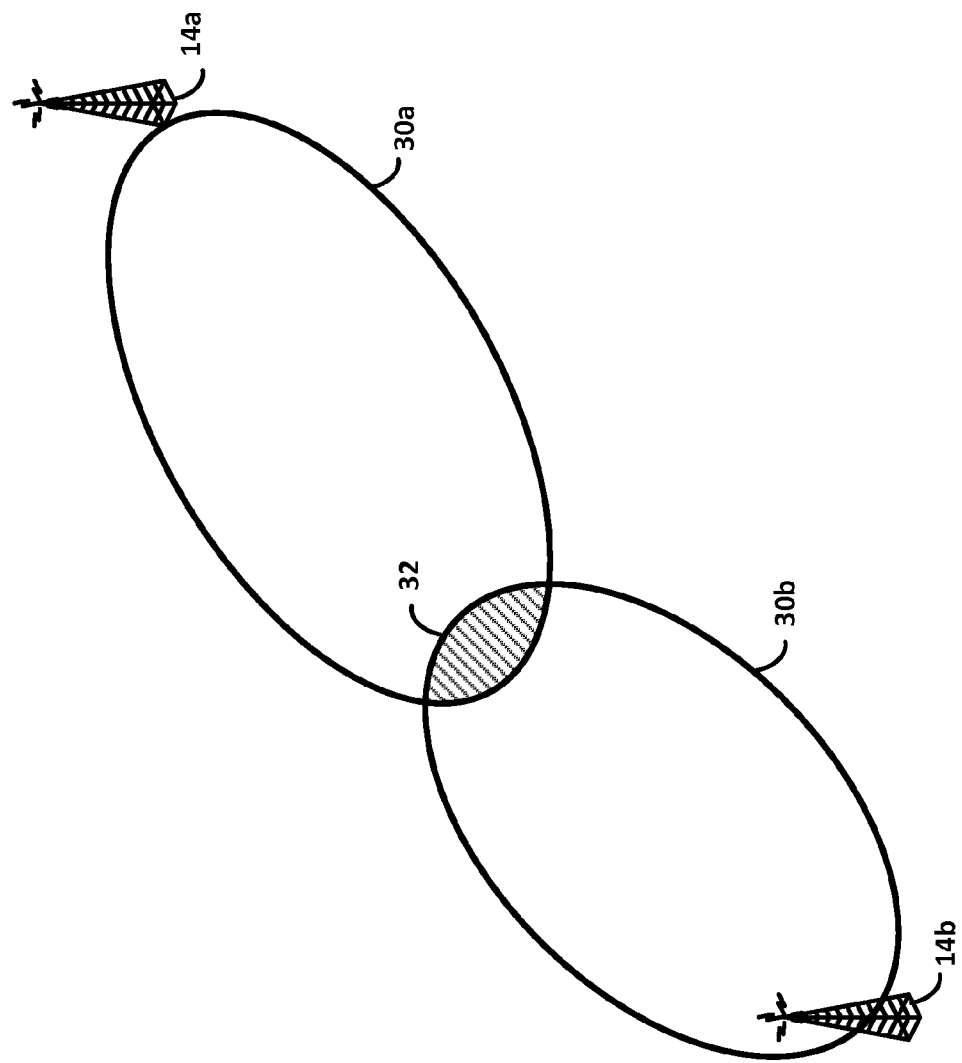
FIG. 3 is an illustration of an example arrangement of coverage areas in the wireless communication system.

In some examples, the wireless communication system may also comprise a neighbor base station that radiates to define a neighbor coverage area and provides service in the second coverage area on multiple carriers, with the first coverage area and the second coverage area overlapping each other to define an area of overlap. FIG. 3 shows an example arrangement of the base stations in such a wireless communication system. As shown, a first base station 14*a* radiates to define a first coverage area 30*a* while a second base station 14*b* radiates to define a second coverage area 30*b*, the coverage areas overlapping each other to define an area of overlap 32. For illustrative purposes, assume the first base station 14*a* serves a UE located in the area of overlap 32 in the first coverage area 30*a* on a first carrier. Per the disclosure, in response to determining that a UE located in the area of overlap 32 is substantially stationary, the first base station 14*a*, could serve that UE in the first coverage area 30*a* on a first and second carrier. Alternatively, the first base station 14*a* could cause the second base station 14*b* to serve the UE on a carrier in the second coverage area concurrently with the first base station 14*a* continuing to serve the UE on a carrier in the first coverage area 30*a*.

In the latter example, the UE could identify the carrier in the second coverage area 30*b* as a component carrier in response to receiving a downlink reference signal from the second base station 14*b* on the carrier in the second coverage area 30*b*. By contrast, the first base station 14*a* may have access to information of the area covered by the second coverage area 30*b*, and may thus identify the carrier in the second coverage area 30*b* as the a component carrier after determining that the UE is located within the second coverage area 30*b*. The first base station 14*a* may also communicate with the second base station 14*b* via a backhaul interface (e.g., an X2 interface) to verify that the carrier in the second coverage area 30*b* is capable of being a component carrier (e.g., the second coverage area has sufficient capacity and the second base station 14*b* is configured to provide carrier aggregated service on the second carrier. After identifying the carrier in the second coverage area 30*b* as a component carrier, the first base station 14*a* may coordinate with the second base station 14*b* to assign the one or more resource blocks on the PUSCH or the PDSCH of the carrier in the second coverage area. The first base station may then send to the UE information indicative of the assigned resources in the second coverage area, and the first and second base stations 14*a*, 14*b* may then serve the UE using carrier aggregation.

The first base station 14*a* and the second base station 14*b* may continuing serving the UE using carrier aggregation until the UE completes the communication session with the network entity (e.g., without handing over the UE from the first base station to the second base station). Further, as discussed above, the first base station 14*a* and the second base station 14*b* may serve the UE during the communication session using carrier aggregation so long as the UE remains substantially stationary. To this end, the first base station 14a or the UE may periodically perform functions similar to those described with respect to block 104 to determine if the UE is substantially stationary. Upon determining that the UE is not substantially stationary, the first base station may signal the UE and communicate with the second base station 14b to end the carrier-aggregated service.

In yet another example, the first base station 14a may aggregate more than one carrier when performing the functions of block 108. For instance, the first base station 14a could assign to the UE, for one or more TTIs, one or more resource blocks on either the PDSCH or the PUSCH of a second carrier in the first coverage area 30a and, for one or more other TTIs, one or more resource blocks on either the PDSCH or the PUSCH of a carrier (or carriers) provided by the second base station 14b in the second coverage area 30b. The first base station 14a may then serve the UE in the first coverage area 30a on multiple carriers while the second base station 14b concurrently serves the UE in the second coverage area 30b on one or more carriers.

Figure 4:
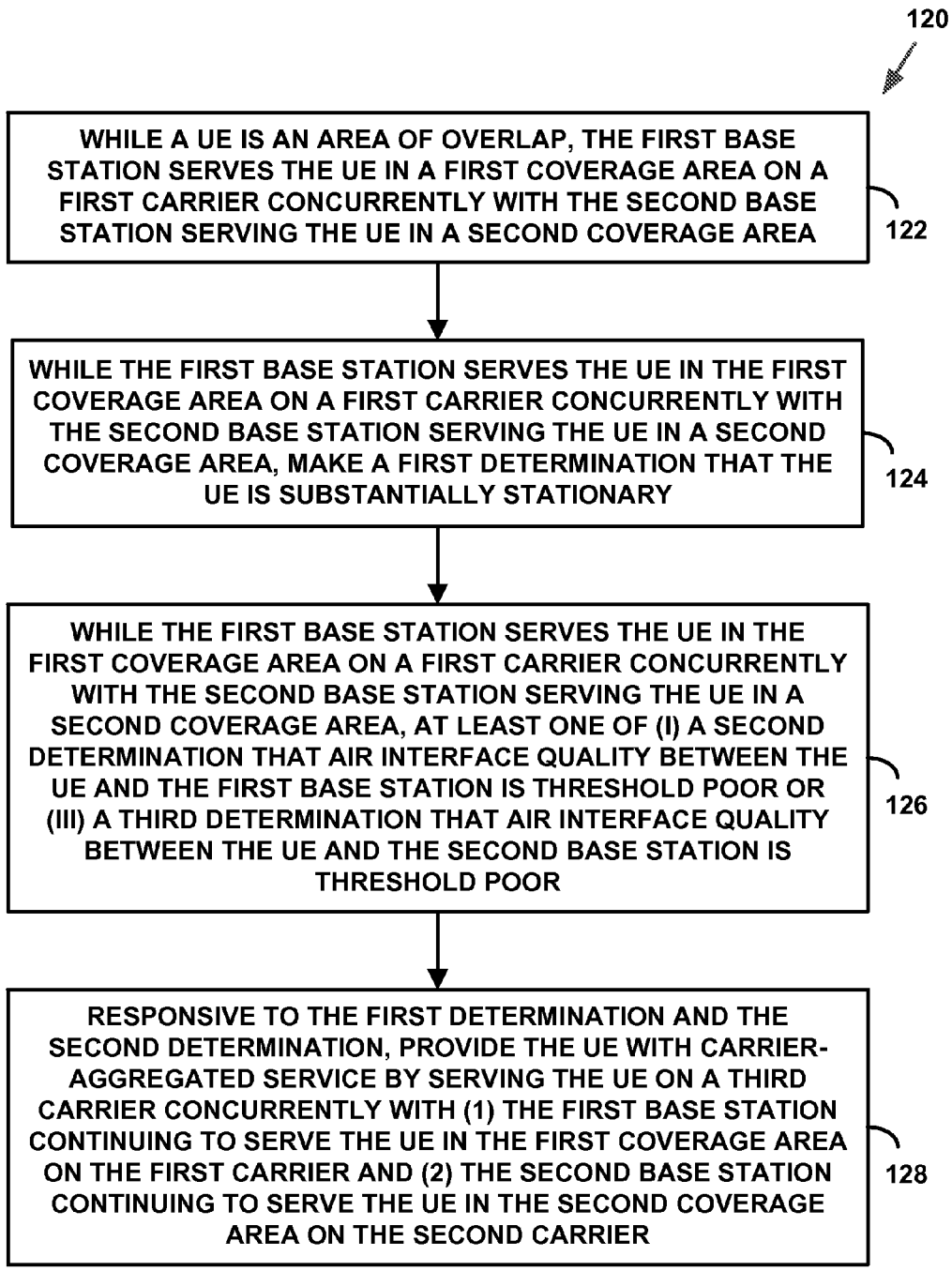
FIG. 4 is a flow chart depicting example UE operations in accordance with the disclosure.

In a variation of the last example, a serving base station could aggregate a third carrier for serving the UE while the first base station and the second base station serve the UE using carrier aggregation. FIG. 4 shows a flow diagram of an example method 120 for adding a component carrier when a mobility-limited UE already receives carrier-aggregated wireless service.

Beginning at block 122, the method 120 includes the first base station serving the UE in the first coverage area on the first carrier concurrently with the second base station serving the UE in the second coverage area on the second carrier while the UE is located in the area of overlap. While the first base station serves the UE in the first coverage area on the first carrier concurrently with the second base station serving the UE in the second coverage area on the second carrier, the method 120 then includes making a first determination that the UE is substantially stationary, at block 124. Either the first base station or the UE may make the first determination, as described with respect to block 104 of the method 100.

Also while the first base station serves the UE in the first coverage area on the first carrier concurrently with the second base station serving the UE in the second coverage area on the second carrier, the method 120 includes making at least one of (i) a second determination that air interface quality between the first base station and the UE is threshold poor or (ii) a third determination that air interface quality between the second base station and the UE is threshold poor, at block 126.

As with previously described determinations, either the first base station or the UE may also make the second or third determinations. For instance, the UE could make the second or third determinations by determining that downlink air interface quality between the UE and either the first base station or the second base station, respectively, is threshold poor. Alternatively, the UE could determine and send to the first base station a first CQI for the first coverage area and a second CQI for the second coverage area, with each CQI being based on at least the UE's downlink air interface quality in the respective coverage area. After receiving the first CQI and the second CQI, the first base station may make the second or third determinations by determining that the first CQI or the second CQI, respectively, is threshold low.

As another example, the UE could send an uplink reference signal to each of the first base station and the second base station. The first base station may thus receive from the UE a first uplink reference signal, while the second base station may receive from the UE a second uplink reference signal. The first base station may then make the second determination by determining, based on at least the first uplink reference signal, that uplink air interface quality between the UE and the first base station is threshold poor.

To make the third determination, the first base station may receive from the second base station via a backhaul interface (e.g., X2 interface) a message that includes data indicative of the second uplink reference signal. By way of example, such data could include the second uplink reference signal or an indication of the second base station having determined that UE's 16 uplink air interface quality in the second coverage area is threshold poor. Based on the data included in the received message, the first base station may make the third determination.

Finally at block 128, responsive to making the first determination and at least one of the second or third determinations, the method 120 includes serving the UE on a third carrier concurrently with (1) the first base station continuing to serve the UE in the first coverage area on the first carrier and (2) the second base station continuing to serve the UE in the second coverage area on the second carrier. Like the functions of block 108, performing the functions of block 128 may include identifying the third carrier as one of one or more component carriers for carrier aggregation. Here, the third carrier could be provided by the first base station, the second base station, or even a third base station.

After the first base station or the UE so identifies the third carrier, the first base station may assign to the UE, in a particular TTI, one or more resource blocks on either the PDSCH or the PUSCH of the third carrier, perhaps by communicating with the second base station if the second base station provides the second carrier in the second coverage or the third base station if the third base station provides the third carrier in a third coverage area. The first base station may then inform the UE of the assigned resources thereby providing the UE with carrier-aggregated service on three carriers.

Consistent with the description of the method 100, the base stations may continue serving the UE with carrier aggregation until the communication session is complete or while the UE is substantially stationary. And as also described above, the first base station could signal the UE to temporarily stop monitoring for handover-related events, thereby conserving the UE's 16 battery power.

Note that while the method 120 is described as being implemented while the UE initially receives carrier-aggregated service from the first and second base stations, the method 120 could also be implemented in a situation where the first base station serves the UE on one or more carrier in each of one or more coverage areas. In this case, the UE may aggregate a third carrier from the first coverage area or a carrier from another base station when performing the functions of block 128. Further, the first base station could aggregate multiple carriers for serving the UE when performing the functions of block 128. For example, the first base station could aggregate a carrier from each of the second coverage area and the third coverage area.

In some implementations, a base station or a UE may not perform the functions of each block of the methods 100 or 120. At a minimum, performing the functions of blocks 108 or block 128 occurs responsive to at least making a determination that the UE is substantially stationary. As a result, implementation of the methods 100 or 120 is not limited to situations in which air interface quality between a serving base station and a UE is threshold poor.

Figure 5:
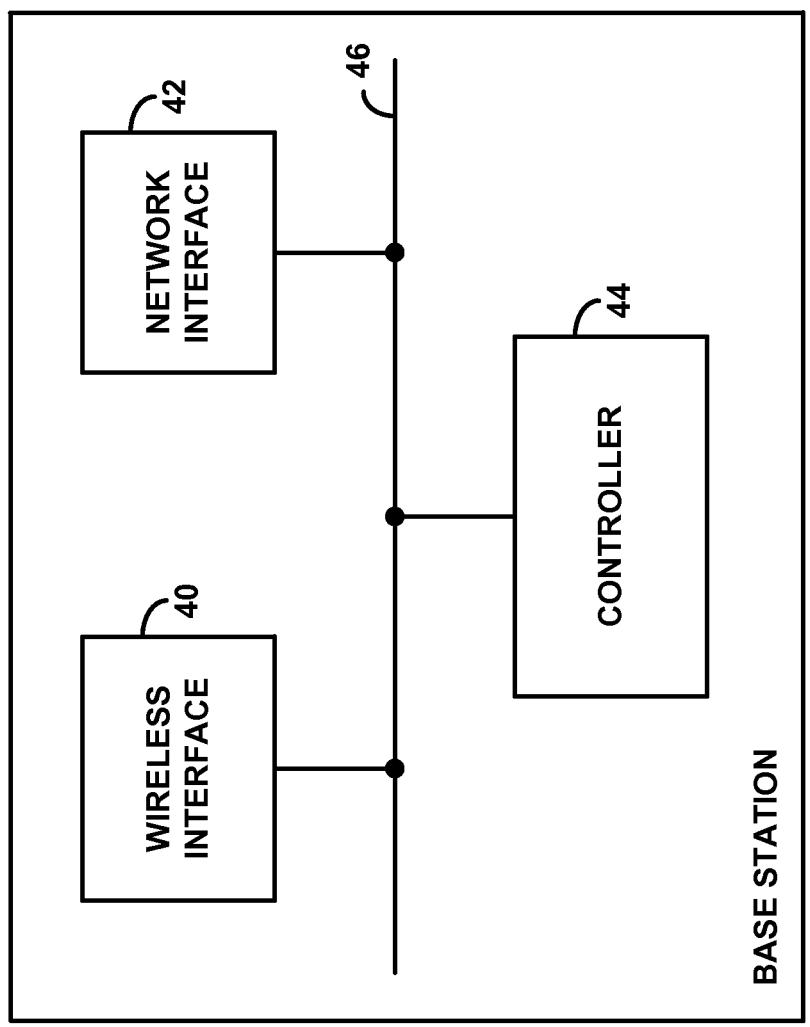
FIG. 5 is a simplified block diagram of an example base station operable in accordance with the disclosure.

Turning now to FIG. 5, a simplified block diagram of an example base station is shown. The example base station, which could function as any of the serving base stations described above, includes a wireless communication interface 50, a backhaul interface 52, and a controller 54, all of which may be communicatively linked together by a system bus, network, or other connection mechanism 56.

In this arrangement, the wireless communication interface 50 may be configured to provide cellular coverage and to engage in air interface communication with served UEs. As such, the wireless communication interface 50 may comprise an antenna structure (not shown), which may be tower mounted or may take other forms, and associated components such as a power amplifier and a wireless transceiver, so as to facilitate transmission and reception of bearer and control data over an air interface in accordance with an air interface protocol such as LTE or others as noted above. Further, the backhaul interface 52 may comprise a wired or wireless interface, such as an Ethernet network communication interface, configured to support communication with other entities, such as X2 communication with other base stations for instance.

The controller 54 may then comprise control logic to cause the base station to carry out particular functions including those discussed above. As such, the controller 54 may take various forms, including but not limited to one or more processors (e.g., general purpose microprocessors and/or dedicated processing units) and data storage holding program instructions executable by the processors(s) to carry out various functions described herein, such as the functions described with respect to either or both of the methods 100 or 120.

Figure 6:
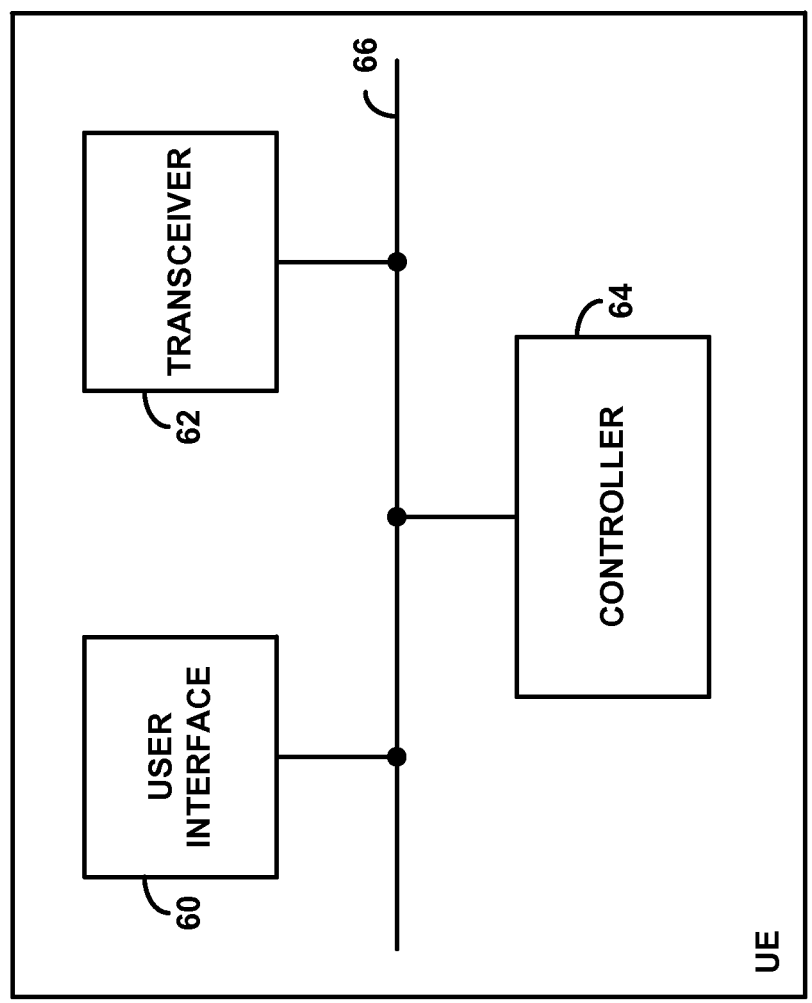
FIG. 6 is a simplified block diagram of an example UE operable in accordance with the disclosure.

Finally, FIG. 6 is a simplified block diagram of an example UE, showing some of the components of such a UE to facilitate operation in accordance with this disclosure. As shown in FIG. 6, the example UE includes a user interface 60, a transceiver 62, and a controller 64, with various ones of these or other components being communicatively linked together by a system bus, network, or other connection mechanism 66.

The user interface 60 may include input and output components to facilitate interaction with a user, if the UE is a user-operable device. The transceiver 62, which includes an antenna structure (not shown) may then function in combination to engage in air interface communication with a cellular base station such as one of the above-described base stations. And controller 64, which may be integrated with the transceiver 62 or one or more other components, may control the processing of received communications, including control and user data, to carry out various UE operations described herein, such as the functions described with respect to either or both of the methods 100 or 120.

Exemplary embodiments have been described above. Those skilled in the art will understand, however, that changes and modifications may be made to these embodiments without departing from the true scope and spirit of the invention.

We claim:

1. A method operable in a wireless communication system comprising (i) a first base station that radiates to define a first coverage area and (ii) a second base station that radiates to define a second coverage area, wherein the first coverage area and the second coverage area overlap each other to define an area of overlap, the method comprising:

while a user equipment device (UE) is located in the area of overlap, the first base station serving the UE in the first coverage area on a first carrier;

while the first base station serves the UE in the first coverage area on the first carrier, (i) making a first determination that the UE is substantially stationary and (ii) making a second determination that air interface quality between the first base station and the UE is threshold poor, wherein the first base station receives from the UE a channel quality indicator that is indicative of at least downlink air interface quality between the first base station and the UE, and wherein making the second determination is based on determining, based on at least the received channel quality indicator, that the downlink air interface quality between the first base station and the UE is threshold poor; and responsive to at least the first determination and the second determination, invoking carrier aggregation service for the UE, wherein invoking carrier aggregation service for the UE comprises causing the second base station to begin serving the UE in the second coverage area on a second carrier concurrently with the first base station continuing to serve the UE in the first coverage area on the first carrier.

2. The method of claim 1, wherein making the first determination comprises determining that, for a predefined non-zero threshold time period, the UE does not move more than a predefined threshold extent.

3. The method of claim 1, wherein the wireless communication system further comprises a mobile location system configured to determine a location of the UE, and wherein making the first determination comprises the first base station receiving from the mobile location system a plurality of location reports, wherein each location report includes data correlating a location of the UE to a particular time, and wherein making the first determination comprises the first base station making the first determination based on at least the data included in each of the plurality of location reports.

4. The method of claim 1, further comprising the first base station receiving from the UE a plurality of location reports, wherein each location report includes data correlating a location of the UE to a particular time, and wherein making the first determination comprises the first base station making the first determination based on the data included in each of the plurality of location reports.

5. The method of claim 1, further comprising the first base station receiving from the UE an uplink reference signal, wherein making the second determination is based on determining, based on at least the uplink reference signal, that uplink air interface quality between the first base station and the UE is threshold poor.

6. The method of claim 1, wherein causing the second base station to begin serving the UE in the second coverage area on the second carrier concurrently with the first base station continuing to serve the UE in the first coverage area on the first carrier comprises identifying the second carrier as one of one or more component carriers for carrier aggregation.

7. The method of claim 1, wherein the wireless communication system further comprises a third base station that radiates to define a third coverage area, wherein the third coverage area overlaps each of first coverage area and the second coverage area in the area of overlap, and wherein the invoking carrier aggregation service for the UE further comprises causing the third base station to begin serving the UE in the third coverage area on one of a third carrier concurrently with (a) the first base station continuing to serve the UE in the first coverage area on the first carrier and (b) the second base station beginning to serve the UE in the second coverage area on the second carrier.

8. A wireless communication system comprising a first base station that radiates to define a first coverage area and a second base station that radiates to define a second coverage area, wherein the first coverage area and the second coverage area overlap each other to define an area of overlap, and wherein the first base station comprises:
- an antenna structure configured to radiate to define the first coverage area;
- a network communication interface for communicating with the second base station; and
- a controller configured to:
  (i) cause the base station to serve a user equipment device (UE) in the first coverage area on a first carrier while the UE is located in the area of overlap,
  (ii) while the base station serves the UE in the first coverage area on the first carrier, (a) make a first determination that the UE is substantially stationary and (b) make a second determination that the air interface quality between the first base station and the UE is threshold poor, wherein the first base station receives from the UE a channel quality indicator that is indicative of at least downlink air interface quality between the first base station and the UE, and wherein making the second determination is based on at least the received channel quality indicator, and
  (iii) responsive to at least the first determination and the second determination, invoke carrier aggregation service for the UE,
- wherein invoking carrier aggregation service for the UE comprises communicating via the network communication interface with the second base station to cause the second base station to begin serving the UE in the second coverage area on a second carrier concurrently with the base station continuing to serve the UE in the first coverage area on the first carrier.

9. The base station of claim 8, wherein, to make the first determination, the controller is configured to determine that, for a predefined non-zero threshold time period, the UE does not move more than a predefined threshold extent.

* * * * *